(12) United States Patent
Scherbarth

(10) Patent No.: US 7,410,332 B2
(45) Date of Patent: Aug. 12, 2008

(54) CUTTING BIT WITH A FACE CUTTING EDGE, IN PARTICULAR FOR FACE MILLING CUTTERS

(75) Inventor: Stefan Scherbarth, Neuss (DE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/802,249

(22) Filed: May 21, 2007

(65) Prior Publication Data
US 2007/0269278 A1  Nov. 22, 2007

(30) Foreign Application Priority Data
May 22, 2006 (DE) .................. 10 2006 024 131

(51) Int. Cl.
B23P 15/28 (2006.01)
B26D 1/00 (2006.01)
(52) U.S. Cl. ........................ 407/113; 407/114
(58) Field of Classification Search ............... 407/113, 407/114, 115, 116, 117, 118, 119, 120, 11
See application file for complete search history.

(56) References Cited

U.S. PATENT DOCUMENTS 4,475,851 A * 10/1984 Hale ................ 407/113
5,525,016 A * 6/1996 Paya et al. ........... 407/116
5,827,016 A * 10/1998 Strand ................ 407/115
5,971,676 A * 10/1999 Kojima ............... 408/231
6,543,970 B1 4/2003 Qvarth et al.
6,733,214 B2 * 5/2004 Scherbarth ............ 407/113

* cited by examiner

Primary Examiner—Willmon Fridie, Jr.
(74) Attorney, Agent, or Firm—Drinker Biddle & Reath LLP

(57) ABSTRACT

A cutting bit (10), in particular for face milling cutters, having an upper and a lower surface (3) which are connected by circumferential edge surfaces (4), wherein the cutting bit in plan view on to the upper surface (3) is of an approximately octagonal basic shape with alternately small and large corner angles, wherein formed between the respective corners (6, 7) at the transition of the circumferential surfaces (4) to the upper and/or lower surface (3) are respective cutting edges (1a, 1b, 1c, 1d, 2a, 2b, 2c, 2d) of which a part (2a, 2b, 2c, 2d) in a top view appear as in a slightly broken or curved over a relatively smaller radius for use as roughing cutting edges and another part extends between adjacent corners (6, 7) straight or with a relatively larger radius for use as finishing cutting edges (1a, 1b, 1c, 1d). In order to provide a cutting bit having the afore mentioned features, which may also be used as wide finishing cutter, but which nonetheless has at least two and preferably at least four finishing cutting edges which can be used for either direction of rotation, there is suggested that in the top view perpendicularly onto the upper surface the cutting bit is of a symmetrical configuration only with respect to a rotation by 180° but not with respect to a rotation by 90°.

14 Claims, 6 Drawing Sheets

CUTTING BIT WITH A FACE CUTTING EDGE, IN PARTICULAR FOR FACE MILLING CUTTERS

Figure 1:
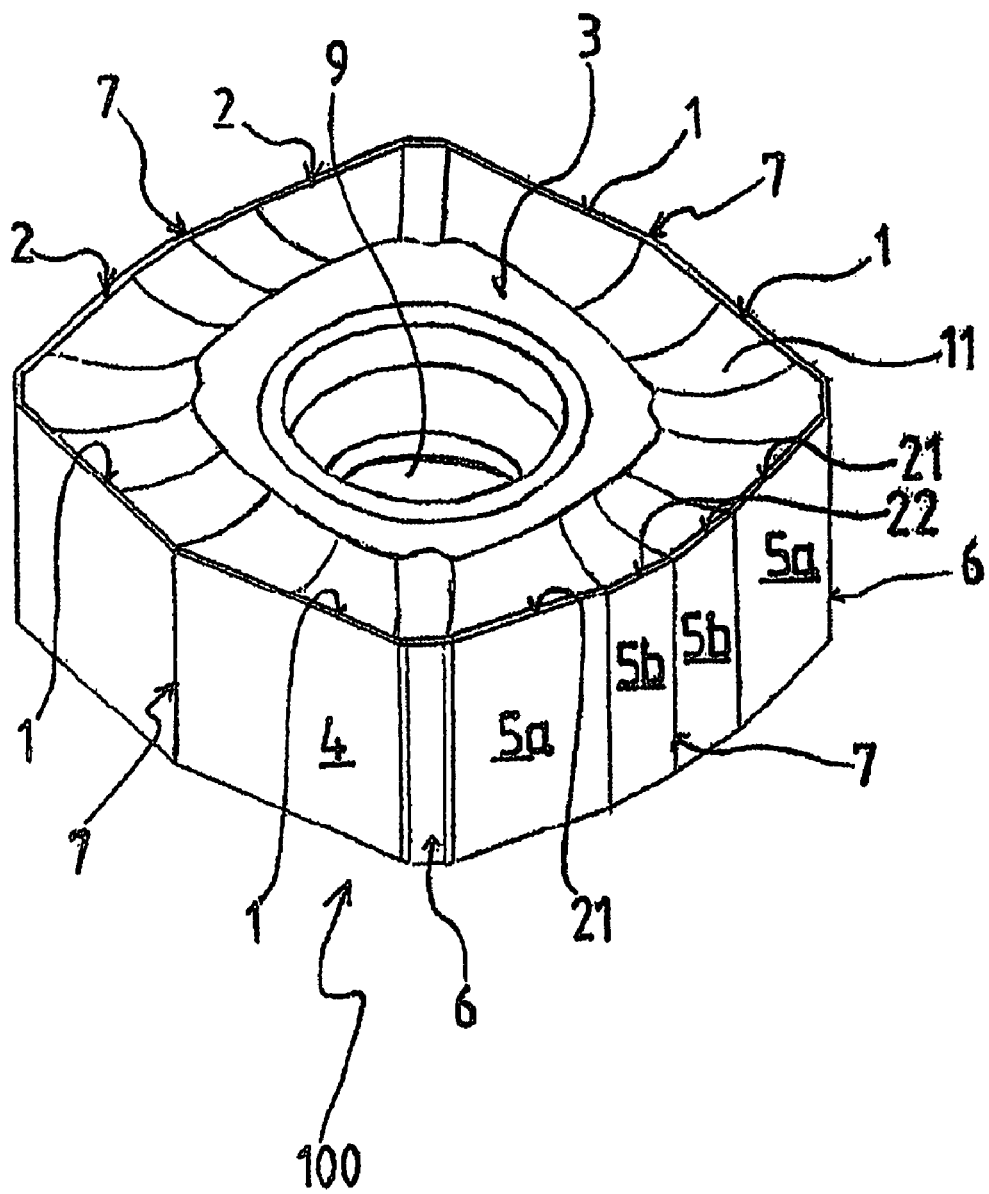

This application claims priority under 35 U.S.C. §119 and/or §365 to German Application No. 10 2006 024 131.2, filed May 22, 2006, the entire contents of which are incorporated herein by reference.

The present invention concerns a cutting bit, in particular for face milling cutters, having an upper and a lower surface which are connected together by circumferential edge surfaces, wherein the cutting bit in plan view on to the upper surface is of an approximately octagonal basic shape with alternately small and large corner angles, wherein formed between the respective corners at the transition of the circumferential surfaces to the upper and/or lower surface are respective cutting edges of which a part for use as roughing cutting edges in plan view extend in a slightly mutually deflected configuration or curved over a partially relatively smaller radius and another part as finishing cutting edges extends between adjacent corners straight or with a relatively larger radius.

The expression 'relatively smaller' radius in this connection is used to denote a radius which is smaller and preferably markedly smaller than the maximum diameter of the cutting bit while a 'relatively larger' radius is larger and preferably markedly larger than the maximum diameter of the cutting bit. The term 'slightly mutually deflected' denotes a kink through a small angle of less than 30°, preferably less than 20° (possibly rounded off at a relatively smaller radius) in an otherwise (almost) rectilinear portion of the contour or the circumferential surfaces and the cutting edges.

A corresponding cutting bit is known for example from U.S. Pat. No. 6,543,970. That known cutting bit is substantially of a very similar basic shape to the cutting bit of the present invention, but all variants of that known cutting bit have a fourfold axis of symmetry, that is to say all side surfaces which respectively extend between two corners with a smaller corner angle are identical and the small and large corner angles are respectively equal to each other. (To simplify the description hereinafter the corners with a smaller corner angle are referred to as 'acute corners' and the corners with a larger corner angle are referred to as 'obtuse corners', even if the smaller corner angle is an obtuse angle (>90°)).

In other words, those known cutting bits are not only of mirror image symmetry with respect to two planes which extend through the oppositely disposed obtuse corners (and contain the central axis perpendicularly to the upper surface) but they are also symmetrical with respect to rotation about the central axis of the cutting bit through 90° in each case and in part also with respect to reflection at planes which extend through the diagonally oppositely disposed acute corners.

In addition those known cutting bits have only relatively short face bevels in the form of short angled minor cutting edges.

In addition it is known, on face milling cutters which are equipped with a plurality of roughing cutting bits (like or similar to those known from U.S. Pat. No. 6,543,970), to replace one of those cutting bits by a so-called wide finishing bit. A wide finishing bit is characterised by a very long cutting edge which is straight or curved at a very large radius, wherein the wide finishing bit is arranged at the axially forward end of a face milling cutter in such a way that the finishing cutting edge extends substantially radially and perpendicularly with respect to the axis of the milling tool. In that respect it is to be noted that the relatively long finishing cutting edge of that wide finishing bit projects in the axial direction slightly beyond the minor cutting edges of the other cutting bits or at any event is not overlapped by any other cutting edge in the axial direction while the roughing cutting edge of the wide finishing bit, which is arranged at the periphery, can possibly be set back radially inwardly somewhat with respect to the major cutting edges (=roughing cutting edges) of the other cutting bits. In operation of such a face milling cutter care is taken to ensure that the radial advance of the milling cutter does not exceed the length of the finishing cutting edge of the wide finishing bit so that the regions which are machined or covered by the finishing cutting edge in successive revolutions of the milling cutter overlap each other so that a smooth flat surface ('face surface') is produced on the workpiece at the end of the face milling cutter.

A disadvantage when using wide cutting bits of that kind however is that, if they should be used in the same, unchanged bit seat as the other cutting bits, they can only have one single effective finishing cutting edge for a predetermined direction of rotation of the milling cutter so that they have to be thrown away after that one cutting edge is worn.

In comparison with that state of the art the object of the present invention is to provide a cutting bit having the features set forth in the opening part of this specification, which is to be used just like a wide finishing bit, but which nonetheless has at least two and preferably at least four finishing cutting edges which can be used for a direction of rotation.

That object is attained in that the cutting bit is admittedly rotationally symmetrical with respect to a rotation about a central axis extending perpendicularly to the upper surface, but it is not rotationally symmetrical with respect to a 90° or 270° rotation.

In a preferred embodiment that definition is satisfied at any event when the cutting bit (in a plan view perpendicularly on to the upper surface) on the one hand involves mirror image symmetry with respect to two mutually perpendicular planes which respectively extend through oppositely disposed obtuse corners and perpendicularly to the plane of the upper and/or lower surface of the cutting bit, but does not involve mirror image symmetry with respect to planes which extend through the diagonally oppositely disposed acute corners.

In other words, it would also be possible to define the cutting bit according to the invention by stating that it has an upper and a lower surface with a circumferential edge surface connecting same and in a plan view on to the upper surface appears substantially octagonal, wherein the cutting bit is characterised in that it has at least two diagonally oppositely arranged smoothing or finishing cutting edges and moreover at least six contact surfaces of which in each case at least three are so arranged in respect of relative angles and positions that they can come into fitting engagement with the contact surfaces of a bit seat which is known for corresponding roughing cutting bits known from U.S. Pat. No. 6,543,970 when a respective one of the finishing cutting edges is arranged at the end of a face milling cutter in a radial plane. In that case the finishing cutting edges should be of a length which corresponds to at least 30% and preferably at least one third of the maximum diameter of the cutting bit. That definition is satisfied even when the cutting bit does not satisfy the symmetry conditions of the above-defined configurations in regard to any irrelevant surface portions which are not provided either for engagement with contact surfaces or which have no influence on chip formation, chip shaping or chip transport. It will be appreciated that the above symmetry features only relate to relevant cutting edges and surface portions.

To facilitate representation, the cutting bit according to the invention can also be viewed approximately as quadrangular in its basic shape, wherein the corners of that quadrangular basic shape are defined by the acute corners and the sides between two acute corners also involve the obtuse corners. In that case the obtuse corners are ignored as 'corners' and are viewed as a modification of the edge configuration between two acute corners.

More specifically the foregoing definition of the preferred variant then means that admittedly in each case the circumferential surfaces extending between acute corners are identical or in mirror image relationship with each other on opposite sides of the cutting bit, but are not identical or in mirror image relationship with the surfaces, which are displaced with respect thereto through 90° in each case, between another pair of acute corners. Two adjacent portions of the circumferential surfaces (and therewith also adjacent cutting edges) between successive acute corners are therefore different from each other while diametrally mutually opposite portions between acute corners are in each case the same or in mirror image relationship with each other.

In that respect it is possible for the cutting edges or portions of the cutting edges (which respectively extend from an acute corner to the next obtuse corner or vice-versa), on two mutually opposite sides of the notional quadrangle, to be respectively in the form of finishing cutting edges which in the case of a face milling cutter extend on the end face and substantially perpendicularly to the milling cutter axis, and for the cutting edges on the two remaining oppositely disposed sides of the quadrangle to be in the form of roughing cutting edges which are to be arranged at the circumference of the milling cutter. In that case the roughing cutting edges are preferably of a slightly angled or partially curved configuration with a relatively smaller radius of curvature whereas the finishing cutting edges extend substantially straight or curved at a very large radius of curvature. This means that the sides of the cutting bit, which are respectively displaced relative to each other through 90°, are necessarily different from each other by virtue of those differing cutting edge configurations, and in a corresponding fashion the circumferential surfaces which are respectively displaced through 90° relative to each other and which adjoin the cutting edges are also different.

In other respects however the cutting bit involves its octagonal basic shape substantially as defined hereinbefore and fits into the same bit seat as a cutting bit in which the wide finishing cutting edges are replaced by cutting edges which substantially correspond to the shape of the roughing cutting edges, wherein the angles of the acute and obtuse corners can also be different between the cutting bit with finishing cutting edges and the roughing cutting bit.

On one side at any event such a cutting bit has two finishing cutting edges which can be used in one direction of rotation, in which respect the remaining two finishing cutting edges could be used for a milling cutter which rotates in the opposite direction. If moreover the cutting bit is in the form of a double-sided reversible cutting bit, that is to say if the upper surface and the lower surface are identical and the circumferential surfaces extend substantially perpendicularly to the planes defined by the upper and lower surfaces or are also of a concave configuration, turning the cutting bit means that for a direction of rotation a total of four finishing cutting edges are available instead of the one wide finishing cutting edge which is available in accordance with the state of the art. That means that the use of such finishing cutting bits becomes substantially more economical and in addition there is no need for the bit seats in a milling cutter to be adapted or altered in any fashion.

In that respect a preferred variant of the reversible cutting bit according to the invention is one in which the acute corners are bevelled or chamfered or rounded off. That makes the corners less sensitive to the shock loadings which occur in the milling cutting operation.

Furthermore in the preferred embodiment the acute corners have an angle which is smaller by at least 30° than the obtuse corners. In particular, in a particularly preferred embodiment, that difference is about 40°, that is to say the acute corners have a corner angle of about 115° and the obtuse corners have a corner angle of approximately 155°, wherein that detail relates to the surface or cutting edge portions immediately adjoining the respective corners, disregarding an otherwise curved or slightly angled configuration of the roughing cutting edges.

The sides with the roughing cutting edges, which are displaced through about 90° with respect to the sides with the finishing cutting edges, in the preferred embodiment comprise a first straight portion extending from the corner with the smaller angle and a second short portion which is slightly angled with respect thereto and which extends to the obtuse corner. The angle configuration between the longer and the short portion of such a finishing cutting edge is in that case of the order of magnitude of 2° to a maximum of 10° and in particular is 5° and the transition between those two portions, just like the corner itself, can be rounded with a smaller radius. Alternatively a part of the roughing cutting edge can be curved with a constant or varying radius.

In addition the cutting bit according to the invention, in the preferred embodiment, has a central fixing bore. That permits fixing in a simple and space-saving fashion without clamping claws.

As already mentioned in the preferred embodiment the cutting bit should also be in the form of a double-sided reversible cutting bit in order in that way to double the number of cutting edges which can be used. The upper and lower surfaces are accordingly identical and the circumferential surfaces extend substantially perpendicularly to the planes defined by the upper and lower surfaces respectively.

The upper surface of the cutting bit and, in the case of a double-sided cutting bit, also the lower surface of the cutting bit should preferably have chip shaping structures which adjoin the respective cutting edges and which are appropriately in the form of a chip recess, wherein the cutting edges themselves can have a very narrow, flat reinforcing surface which is adjoined by the chip recess.

Furthermore, a preferred embodiment of the cutting bit according to the invention is one in which the shortest spacing of a finishing cutting edge relative to the oppositely disposed obtuse-angled corner is slightly greater than the shortest spacing of a roughing cutting edge relative to the obtuse-angled corner which is in opposite relationship to the roughing cutting edge. That difference needs to be only a few tenths of a millimetre, for example between 0.1 and a maximum of 2 mm and provides that, when such a reversible cutting bit is fitted into the bit seat which is otherwise intended for reversible cutting bits which are provided exclusively with roughing cutting edges and which can have for example a fourfold axis of symmetry, the finishing cutting edge of the cutting bit according to the invention projects in the axial direction by a suitable amount with respect to the axially extending cutting edges of the other cutting bits while the corresponding roughing cutting edge of the cutting bit according to the invention, which is arranged at the circumference of the milling cutter, is set back radially somewhat with respect to the other roughing cutting edges. In other words: the cutting bit according to the invention which is intended primarily to produce a flat surface with the finishing cutting edge implements less cutting work with its roughing cutting edge and in return somewhat more cutting work with the finishing cutting edge, in which respect the above-mentioned dimensional difference can also be so adjusted in relation to the other cutting bits that the total loading on that cutting bit is approximately the same or somewhat less than the loading on the other cutting bits.

The invention is also directed to a face milling cutter equipped with a plurality of cutting bits of which at least one but less than half the cutting bits is a cutting bit according to the present invention. Typically, a face milling cutter has at least six to eight cutting bits, and with such a number it is desirable if one of the cutting bits is a cutting bit according to the invention with a relatively long finishing cutting edge, in which case the radial advance of the milling cutter per revolution is set to be less than the length of the finishing cutting edge. In the case of a larger face milling cutter with a larger number of cutting bits, two or three of the cutting bits could also involve the configuration according to the invention, with a relatively long finishing cutting edge. In that case the radial advance of the milling cutter per revolution could be suitably doubled or trebled, that is to say when using two cutting bits with finishing cutting edges (the bits being fitted in diagonally opposite relationship), the radial advance would have to be kept less than double the length of the finishing cutting edge, and in the case of three cutting bits with finishing cutting edge, which are distributed symmetrically around the circumference of the milling cutter, the radial advance could be up to three times the length of one of the finishing cutting edges or somewhat less without the surface produced by the finishing cutting edges becoming uneven. It will be noted however that, when using a plurality of such cutting bits with finishing cutting edges, those cutting bits must be very accurately adjusted and matched to each other in the axial direction, which is not necessary when using only one finishing cutting edge, so that the use of only one cutting bit with a wide finishing edge is also preferred in the case of larger face milling cutters.

Figure 2:
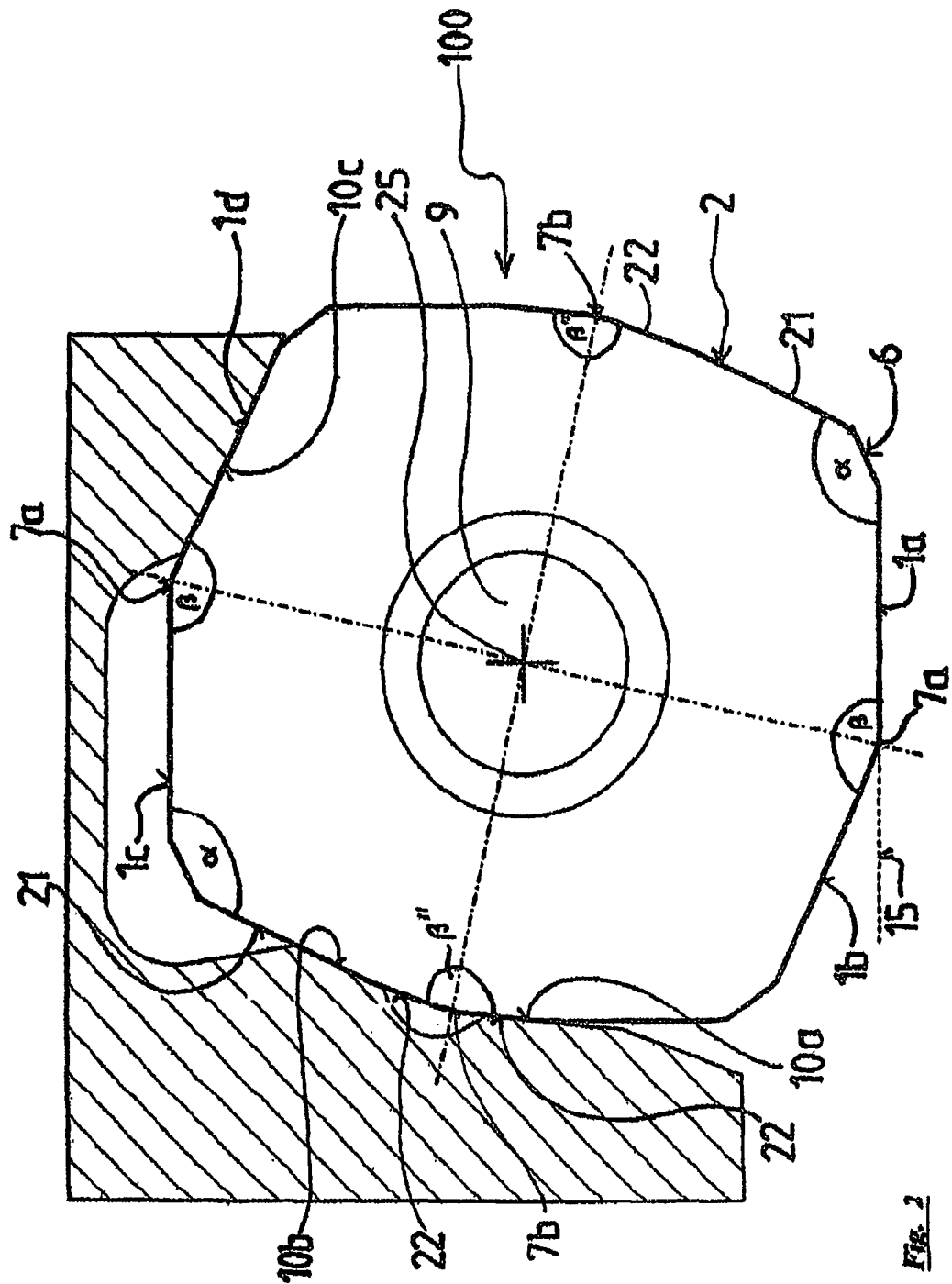
Figure 3:
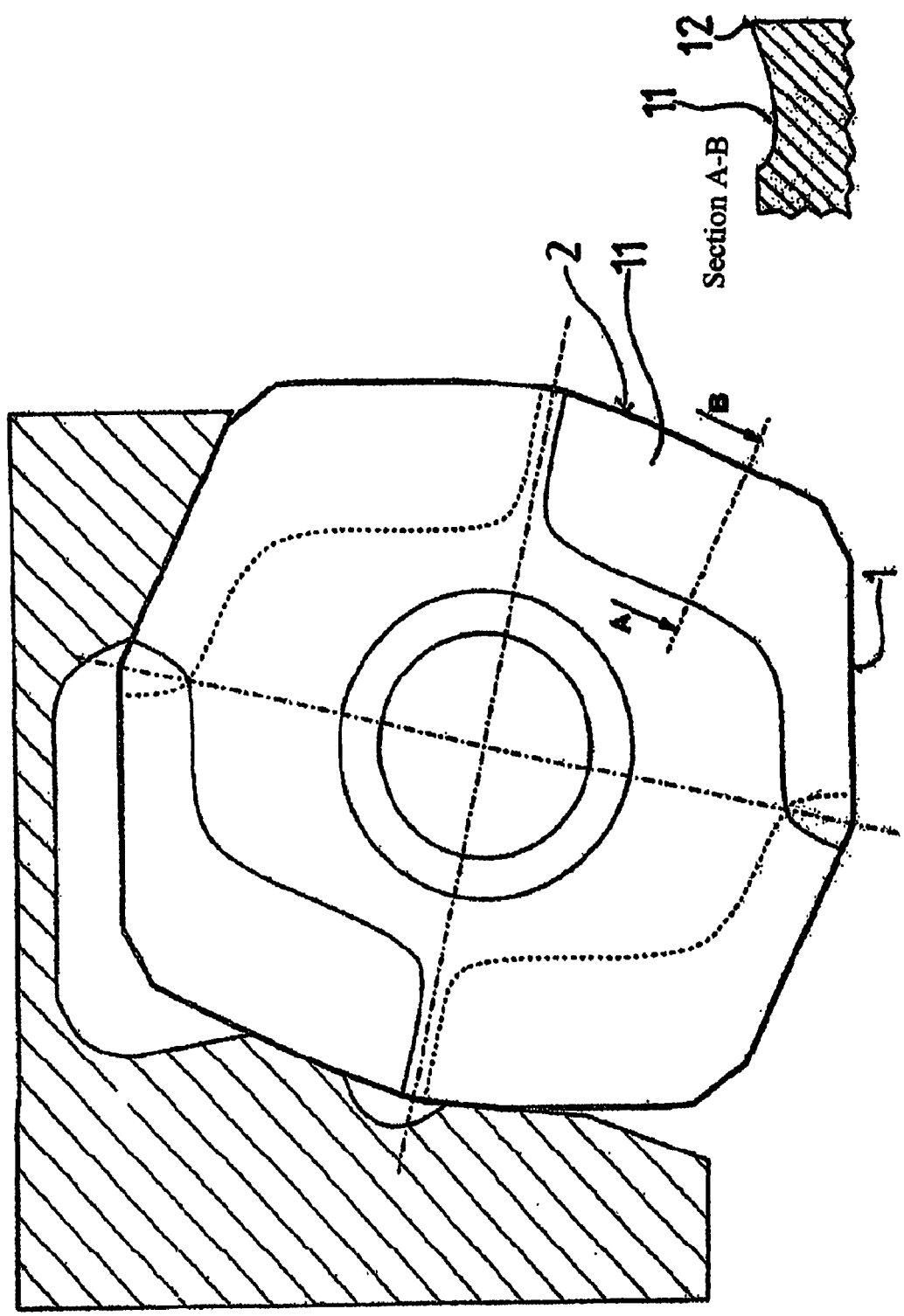
Figure 4:
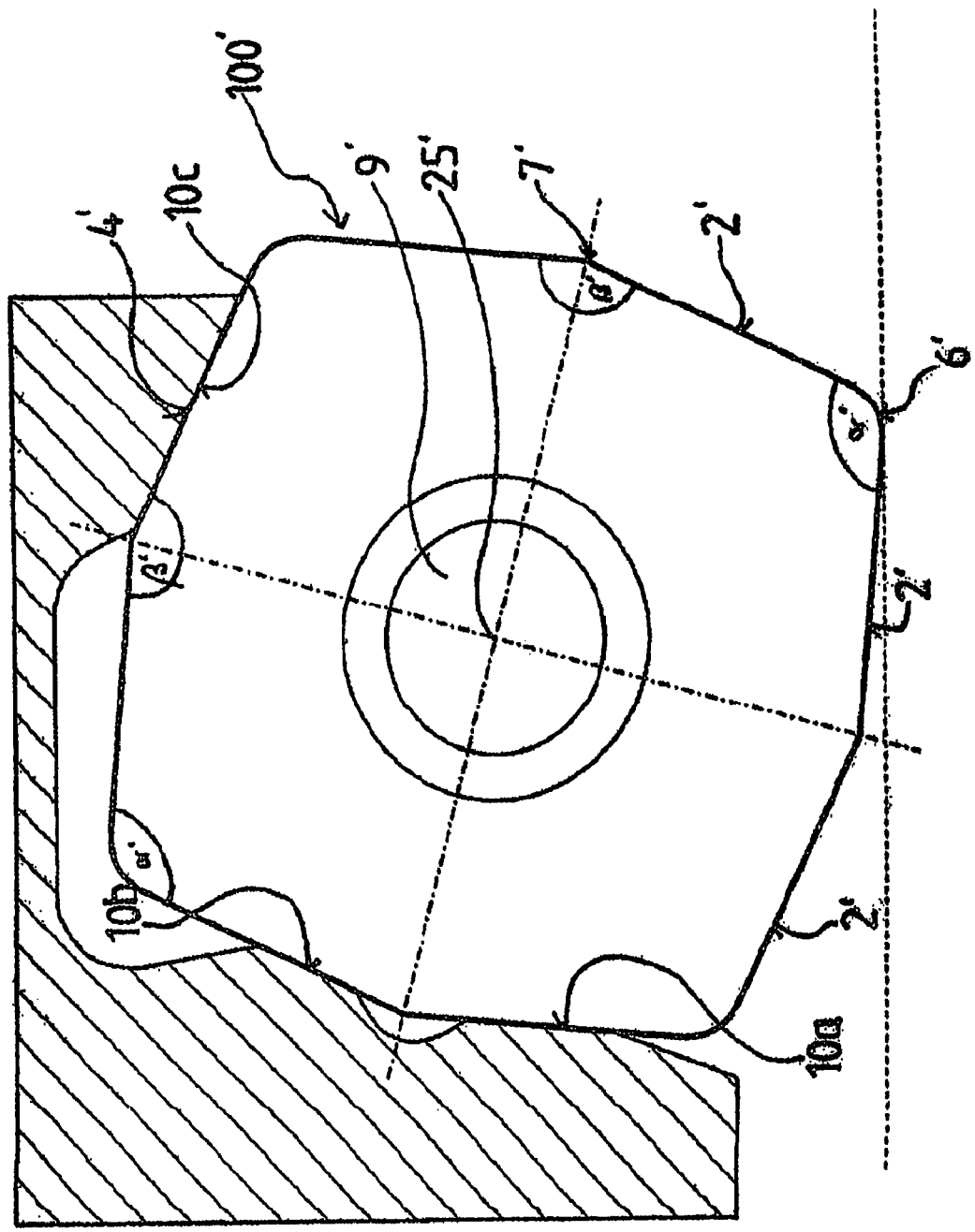
Figure 5:
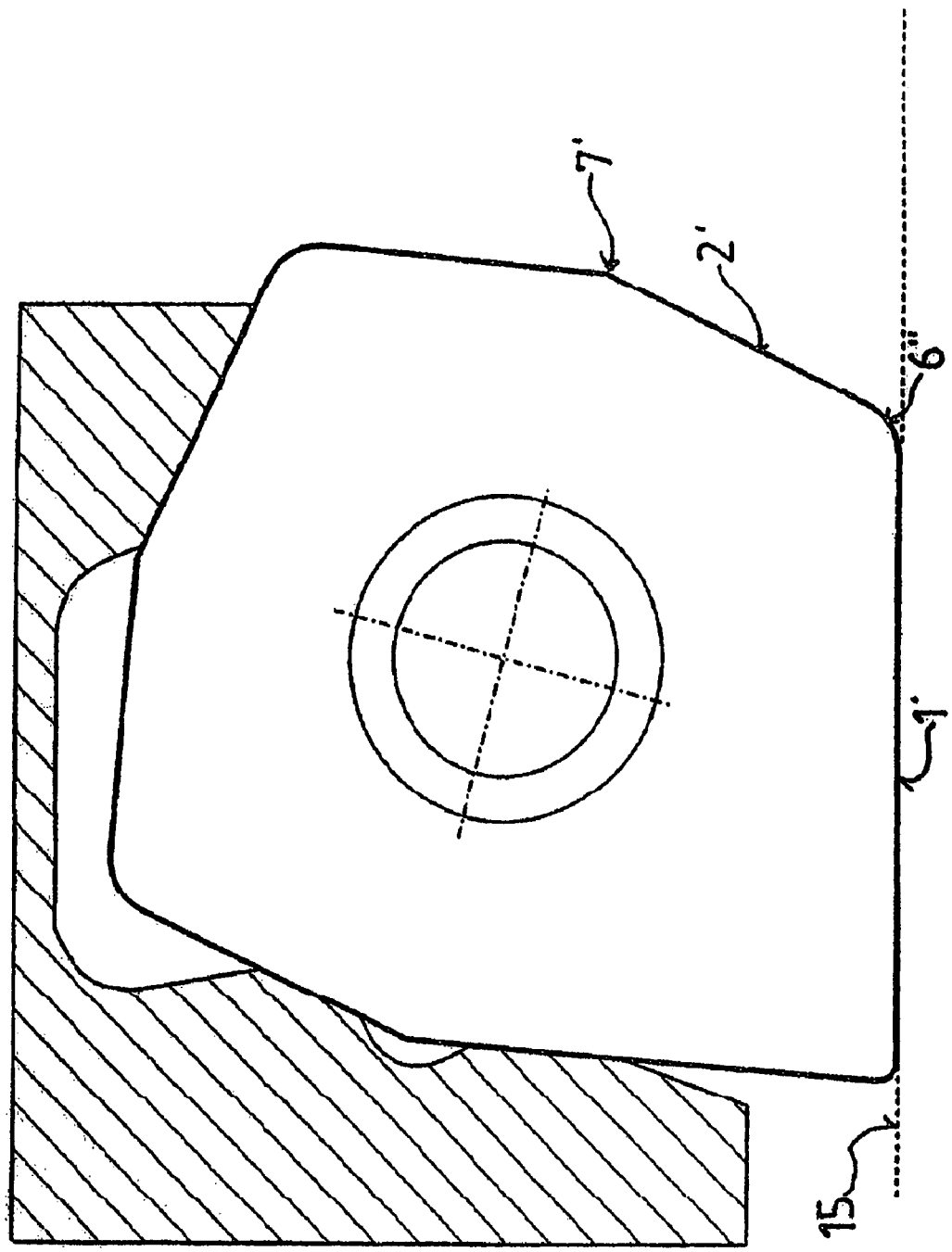
Figure 6:
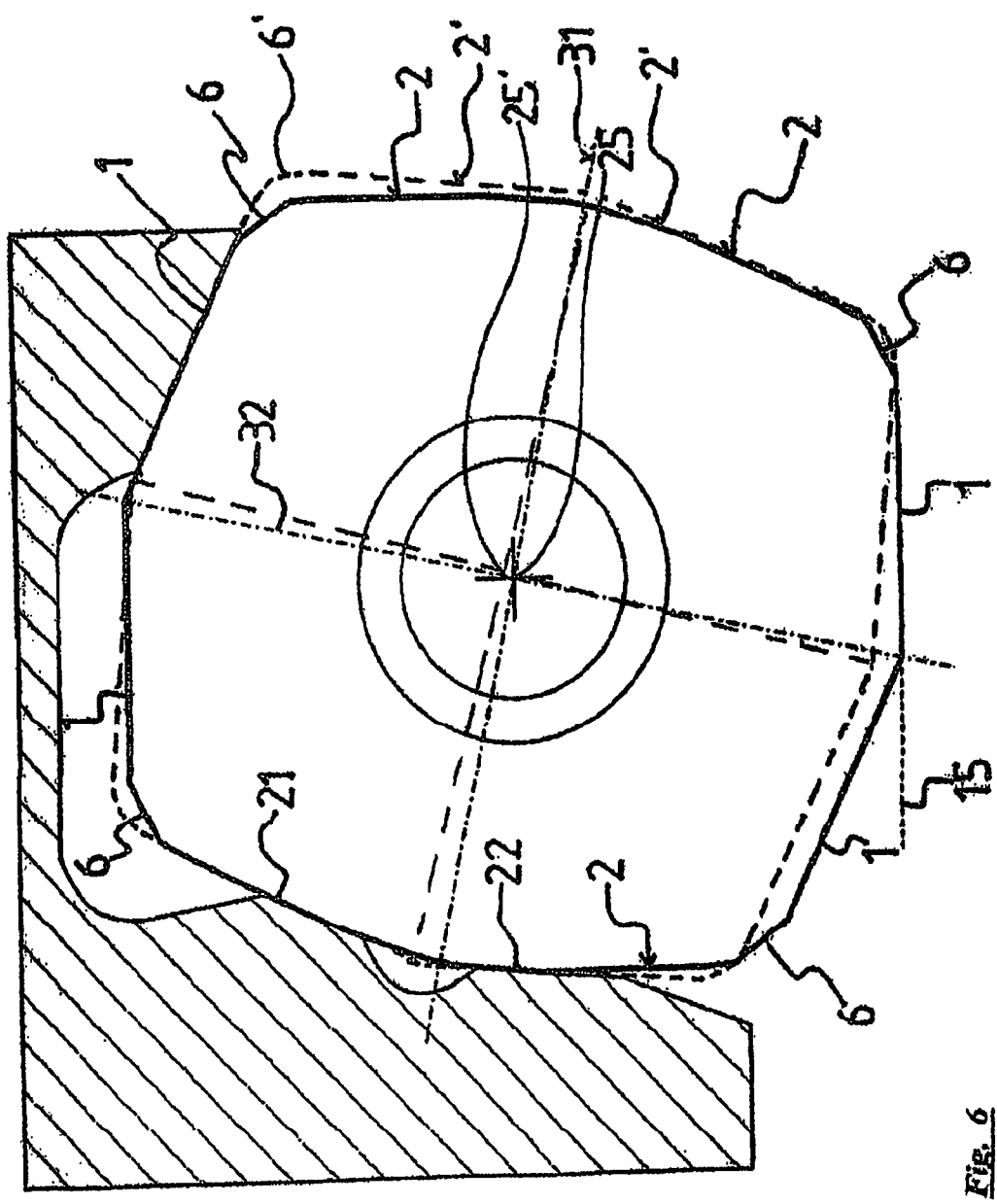

Further advantages, features and possible uses of the present invention will be apparent from the description hereinafter of a preferred embodiment and the accompanying Figures in which:

FIG. 1 shows a perspective view of a cutting bit according to the invention,

FIG. 2 shows a plan view on to the top side of a reversible cutting bit mounted in the bit seat of a face milling cutter, FIG. 3 shows a reversible cutting bit with chip shaping structures in the surface and a sectional view taken along line A-B in FIG. 4, FIG. 4 shows a conventional reversible cutting bit with roughing cutting edges, FIG. 5 shows a conventional reversible cutting with a wide finishing cutting edge, and FIG. 6 shows the reversible cutting bit of FIG. 2 with a roughing cutting bit shown additionally in broken line as illustrated in FIG. 4 in the same bit seat.

FIG. 1 shows a perspective view of a cutting bit according to the invention which is generally identified by reference 100 while FIG. 2 shows a plan view or a view from above showing the contour of the same cutting bit 100 which involves the basic shape of an octagon, with alternately somewhat more acute corners 6 and more obtuse corners 7a, 7b, wherein however for simplicity of description the cutting bit could also be viewed as being quadrangular in its basic shape insofar as the corners 6 with the smaller corner angle are considered as corners of a quadrangle while the sides extending therebetween are viewed as continuous sides of a quadrangle which adjoin each other only in a somewhat curved or kinked and obtuse-angled configuration.

Respective oppositely disposed sides of that quadrangle are identical, that is to say they are in mirror image relationship with each other, but adjacent sides of such a quadrangle, that is to say circumferential surfaces 4 and 5 extending between two corners 6, are not identical to each other. That can be clearly seen from FIG. 1 by reference to the flat circumferential surface portions 4 which adjoin the finishing cutting edges 1 while the corresponding surfaces 5a, 5b which adjoin the cutting edges 2 are evidently kinked or deflected or meet at an obtuse angle. The result of this is that the cutting bit, with respect to a rotation about an axis extending through the central fixing bore 9, is symmetrical only with respect to rotations through 180°, but not with respect to a rotation through 90°.

In addition the cutting bit here is of mirror image configuration with respect to a plane which extends through oppositely disposed obtuse corners 7 and which contains the central axis (not shown) of the cutting bit. That provides that, even after turning through 180° about an axis parallel to the upper or lower surface 3, the cutting bit is of the same configuration as shown in FIG. 1 and the other Figures. It will be noted however that the cutting bit does not involve mirror image symmetry with respect to the planes extending diagonally through the acute corners 6 and the central axis.

The upper surface 3 is once again identical and in mirror image relationship with the lower surface (not shown here).

While in FIG. 1 all acute corners are identified generally by reference 6 and the obtuse corners generally by reference 7, the finishing cutting edges by reference 1 and the roughing cutting edges by reference 2, the obtuse corners 7 and the cutting edges in FIG. 2 are also individually distinguished by the addition of the lower-case letters a and b, and a, b, c and d respectively. Furthermore, in the case of the cutting edges 2, a distinction is also drawn between cutting edge portions 21 and 22.

It will also be seen from FIG. 1 that the cutting edges are reinforced by a narrow flat bevel surface 12 (see also FIG. 3) and is thus less at risk of breaking off, with a chip recess 11 adjoining the bevel 12.

FIG. 4 shows a cutting bit in accordance with the state of the art which has already been discussed hereinbefore, which could be used for a milling cutter according to the invention as a roughing cutting bit, in which case the major and minor cutting edges 2' are here simple straight lines and the transitions from the major cutting edges 2' extending substantially along the circumference to the minor cutting edges 2' extending at the axially front end of the milling cutter are more or less greatly rounded at the corners 6'.

Face milling cutters fitted exclusively with conventional reversible cutting bits of that kind in the illustrated arrangement produce relatively rough end faces as the part of each reversible cutting bit, which axially projects the furthest, is the rounded-off transition of an acute cutting edge corner 6' to the minor cutting edge 2' so that, when the radial advance per cutting bit reaches a dimension within which the curvature of that transition or the corner 6' is visible (that is to say for example an advance per bit approximately equal to the radius of the corner 6'), correspondingly shallow, groove-like depressions are produced. That necessarily occurs by virtue of the specific corner angles of those cutting bits and the specific angles of the contact surfaces 10a, 10b and 10c of the bit seat relative to each other and relative to the milling cutter axis which here extends in parallel relationship along the left-hand edge of the sheet. If however there is a wish to produce a very flat surface on the end of the milling cutter, a so-called wide finishing bit is usually employed, as shown in FIG. 5, that is to say one of the reversible cutting bits which are shown in FIG. 4 and of which a plurality are distributed over the circumference of a face milling cutter, is replaced by the wide finishing bit shown in FIG. 5, the finishing cutting edge of which projects in the axial direction to such an extent that it levels off and eliminates the structures produced by the rounded-off transitions of the cutting corner 6' to the minor cutting edge 2 of the other reversible cutting bits 100'. As already mentioned hereinbefore that requires a wide finishing bit which is specifically adapted to the bit seat of a corresponding face milling cutter and which has only a single usable cutting edge.

When used on milling cutters involving an opposite direction of rotation, such a wide finishing bit could also be in the form of a double-sided bit, but then the number of cutting edges would also be limited to a maximum of two. Those bits must therefore be respectively replaced when the one cutting edge thereof is worn. That is relatively uneconomical and costly. The alternative would involve a wide finishing bit which admittedly could have more usable finishing cutting edges, but which would then require a special bit seat for such a bit, which however would be expensive and inappropriate as then the milling cutter would be restricted to the use of only that one type of roughing and finishing cutting bits.

As can be seen however from FIG. 2 (and even better from FIG. 6) the reversible cutting bit 100 according to the invention can also be fitted into the same bit seat which is formed by contact surfaces 10a, 10b, 10c and which would also accept a reversible cutting bit 100' fitted only with roughing cutting edges, in which case however two (diagonally oppositely disposed) finishing cutting edges 1a, 1d are available solely on one side, which finishing cutting edges are even duplicated to provide four finishing cutting edges when the cutting bit is in the form of a double-sided reversible cutting bit.

The specific shape of the roughing cutting edges 2 and the angle configuration thereof relative to the finishing cutting edges 1, or more precisely the surfaces 4, 5a and 5b adjoining those cutting edges, serves in particular to provide that the cutting bit 100 according to the invention can be accommodated in the same bit seat 10a, 10b, 10c as the roughing bits 100'. When used on a face milling cutter rotating in the opposite direction the number of finishing cutting edges which can be used would even be increased to eight. That signifies an increase in the number of cutting edges by a factor of four, in comparison with the conventional wide finishing bits. Those bits are therefore substantially more economical to use and in regard to their manufacture they require only a slight modification to the starting shape shown in FIG. 4.

As can be seen by means of a comparison of FIG. 2 or 3 with FIG. 4 and in particular by reference to FIG. 6 which shows the cutting bit 100 according to the invention and the cutting bit 100' known from the state of the art in a condition of being drawn in mutually superposed relationship, the cutting bit 100 and the known cutting bit 100' differ inter alia in respect of the corner angles. While the corner angle $\alpha$ of the acute corners 6 in the case of the cutting bit according to the invention is 115° the corresponding angle $\alpha'$ of the corner 6' of the known cutting bit 100' is 110°. The angle of the corners 7a in the cutting bit according to the invention is 155° and the angle $\beta''$ of the obtuse corners 7 of the cutting bit 100 according to the invention is 165°. In contrast the angle $\beta'$ of the obtuse corner 7 of the known cutting bit 100' is 160°. In total however that means that the finishing cutting edges 1 of the cutting bit according to the invention, in their condition of being mounted to a face milling cutter, extend substantially in a plane perpendicular to the milling cutter axis (substantially in a radial direction) while the corresponding cutting edges 2' at the end face of a known cutting bit 100' extend inwardly inclinedly and only the transition at the corners 6' to the minor cutting edges 2 comes into engagement at all with the workpiece.

In that respect however the circumferential surface 4 which is beneath the cutting edge 1d and which as shown in FIG. 2 comes into engagement with the contact surface 10c of a corresponding face milling cutter includes with the surface portion 5a beneath the cutting edge portion 21 which comes into engagement with the contact surface 10b of the milling cutter, the same angle of 90° that the corresponding surfaces 4' which are beneath the cutting edges 2' (indicated in FIG. 4) include with each other. The reason for this is that the sum of the angles $\alpha$ and $\beta$ of the cutting bit 100 is the same as the sum of the angles $\alpha'$ and $\beta'$ of the cutting bit 100' although the angles $\alpha$ and $\alpha'$ and also the angles $\beta$ and $\beta'$ respectively differ by 5°. The contact surface 10a which in the case of the cutting bit according to the invention is again provided for contact of a surface 4' beneath the cutting edge 2' includes the angle $\beta'$ of 160', with the circumferential surface 4' which bears against the contact surface 10b. The corresponding angle $\beta''$ in the cutting bit 100 according to the invention is 165°. As however the surface portions 5b beneath the cutting edge portions 22 in the case of the cutting bit according to the invention, which include the same angle $\beta''$ of 165° with each other, are in turn angled once again through 5° with respect to the circumferential surface portions 5b, that once again affords the same angle of 160° as in the case of the known cutting bit, between the peripheral surface 5a which bears against the contact surface 10b and the peripheral surface 5b which bears against the contact surface 10a. It is clear that the invention is not limited to the use of those specific angles but that only the foregoing sums $\alpha+\beta$ and $\alpha'+\alpha'$ respectively are the same and the angles $\alpha$ and $\alpha'$ and also the angles $\beta$ and $\beta'$ respectively differ by the same angle.

Besides the differing symmetry and the differing corner angles and the kinked side surfaces 5a and 5b the cutting bit 100 according to the invention also differs however in the specific dimensions thereof from the known cutting bit 100'. As can be seen in particular by reference to FIG. 6 the shortest spacing of a cutting edge 1 or circumferential surface 4 relative to the oppositely disposed corner 7 is greater than the corresponding shortest spacing of a cutting edge 2' from the oppositely disposed obtuse corner 7' in the case of the known cutting bit. In contrast, as can also be seen by reference to FIG. 6 in particular at the upper radially outer cutting edge 6, the spacing of that cutting edge 2 or the corresponding portions 21, 22 of the cutting edge 2 in relation to the diagonally oppositely disposed obtuse corner 7b is less than the corresponding smallest spacing of the cutting edge 2' relative to the diagonally oppositely disposed obtuse corner 7'. In the condition of being fitted in its seat moreover the axes of symmetry 31, 32 of the cutting bit 100 are turned somewhat with respect to the corresponding axes (not identified in greater detail here but shown in broken line) of the known cutting bit 100', and the central axes 25 to 25' of the fixing bore are also displaced somewhat relative to each other. As an outcome, that means that the cutting bit according to the invention with its roughing cutting edges 2 and 21, 22 respectively is set back somewhat in a radial direction with respect to the cutting edge 2' of the known cutting bit, but in return it projects in the axial direction with the finishing cutting edges 1 beyond the radially extending cutting edges 2' of the known cutting bit 100'. That in turn means that the roughing cutting edges 2 cut off less material than the roughing cutting edge 2' whereas the finishing cutting edges 1 eliminate the roughnesses left behind by the roughing cutting edges and thus cut more material than the cutting edges 2' of the known cutting bits, which extend in similar fashion in relation thereto and which act as minor cutting edges and which cut material essentially only in the region of the cutting corners 6'.

The cutting bit according to the invention, besides the roughing cutting edges 2, therefore has at least two diagonally oppositely disposed finishing cutting edges 1a and 1c (see FIG. 2) which can be actively used and after the cutting bit has been turned (so that the top side which is visible in FIG. 2 comes to the rear and the rear side is at the front) two further cutting edges which are in opposite relationship to the cutting edges 1b and 1d in FIG. 2 on the other side of the cutting bit can be used as corresponding finishing cutting edges. For a single direction of rotation therefore the cutting bit according to the invention affords a total of four finishing cutting edges whereas the cutting bit of FIG. 5 has only a single finishing cutting edge for one direction of rotation if it is to be fitted in the same bit seat as the other cutting bits. Admittedly the corresponding finishing cutting edge 1' is somewhat longer than the finishing cutting edges 1 of the cutting bit according to the invention and would thus allow an even greater radial advance of a corresponding face milling cutter, but the length of the finishing cutting edges 1 for the cutting bits 100 of the present invention is sufficient by far for most situations of use if a cutting bit of that kind is arranged along the circumference of a face milling cutter. The symmetrical configuration of the preferred embodiment illustrated here in that respect permits universal use of one and the same cutting bit in milling cutters involving an opposite direction of rotation.

Even if the embodiment illustrated here as the preferred embodiment has been described both in a double-sided configuration (that is to say with substantially identical upper and lower sides of which a respective one can serve selectively as a rake face) and also with a central fixing bore it will be appreciated that the advantages of the invention are also enjoyed when the cutting bit is produced in the form of a single-sided bit (but rotatable through 180° about an axis perpendicular to the upper surface) and/or without a central fixing bore (for example for fixing by means of a clamping claw or clamping wedge). Such embodiments are therefore obviously also embraced by the scope of protection of the present invention as is set forth in the claims.

The invention claimed is:

1. A cutting bit, in particular for face milling cutters, having an upper and a lower surface which are connected together by circumferential edge surfaces, wherein the cutting bit in plan view on to the upper surface is of an approximately octagonal basic shape with alternately small and large corner angles, wherein formed between the respective corners at the transition of the circumferential surfaces to the upper and/or lower surface are respective cutting edges of which a part for use as roughing cutting edges in plan view extend in a slightly mutually deflected configuration or curved over a relatively smaller radius and another part as finishing cutting edges extends between adjacent corners straight or with a relatively larger radius, wherein in the plan view perpendicularly on to the surface the cutting bit is of a symmetrical configuration only with respect to a rotation through 180° but not with respect to a rotation through 90°.

2. A cutting bit according to claim 1, wherein in the plan view perpendicularly on to the upper surface it is of a mirror image symmetrical configuration with respect to two mutually perpendicular planes which respectively extend through oppositely disposed corners with large and obtuse corner angles and perpendicularly to the plane defined by the upper surface.

3. A cutting bit according to claim 1, wherein the corners with the smaller or acute corner angles are broken by a rounded configuration or a short chamfer or bevel.

4. A cutting bit according to claim 1, wherein the smaller corner angles, without consideration of rounded configurations or bevels, are respectively smaller than the larger corner angles by at least 30°.

5. A cutting bit according to claim 1, wherein the roughing cutting edges extend from a corner with a smaller corner angle firstly by way of a first, preferably larger cutting edge portion in a straight line and then deflected through a small angle of between 2 and 10° over a second, preferably shorter portion in a straight line to the corner with the larger corner angle, wherein adjacent second portions define the obtuse corner angle.

6. A cutting bit according to claim 1, wherein it has a central bore.

7. A cutting bit according to claim 1, wherein it is in the form of a double-sided cutting bit.

8. A cutting bit according to claim 1, wherein the upper and/or the lower surface adjoining the cutting edges has a chip shaping structure, in particular a chip recess.

9. A cutting bit according to claim 1, wherein the shortest spacing of a finishing cutting edge relative to a diagonally oppositely disposed obtuse corner is greater than the shortest spacing of a roughing cutting edge relative to a diagonally oppositely disposed obtuse corner.

10. A cutting bit according to claim 9, wherein the difference in the shortest spacing is between 0.1 and 2 mm.

11. A face milling cutter with seats arranged at the circumference at the front end, for a plurality of roughing cutting bits which are octagonal in basic shape, wherein a cutting bit according to claim 1 is arranged in at least one bit seat.

12. A face milling cutter according to claim 11, wherein the bit seats for the roughing cutting bits and the finishing cutting bit are identical and are axially and radially identically positioned.

13. A cutting bit according to claim 4, wherein the smaller corner angles, without consideration of rounded configurations or bevels, are respectively smaller than the larger corner angles by about 40°.

14. A cutting bit according to claim 10, wherein the difference in the shortest spacing is between 0.2 and 0.6 mm.

* * * * *